United States Patent
Ali et al.

(10) Patent No.: US 9,398,314 B2
(45) Date of Patent: *Jul. 19, 2016

(54) ENTROPY CODING EFFICIENCY ENHANCEMENT UTILIZING ENERGY DISTRIBUTION REMAPPING

(75) Inventors: Walid Ali, Sammamish, WA (US); Shankar Regunathan, Bellevue, WA (US); Guo-Wei Shieh, Sammamish, WA (US); Bruce Lin, Redmond, WA (US); Bharath Siravara, Redmond, WA (US); Ce Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1841 days.

This patent is subject to a terminal disclaimer.

(21) Appl. No.: 12/026,534
(22) Filed: Feb. 5, 2008
(65) Prior Publication Data
US 2009/0196338 A1 Aug. 6, 2009

(51) Int. Cl.
*H04N 7/12* (2006.01)
*H04N 19/85* (2014.01)

(52) U.S. Cl.
CPC ..................... *H04N 19/85* (2014.11)

(58) Field of Classification Search
None
See application file for complete search history.

(56) References Cited

U.S. PATENT DOCUMENTS

| | | | |
|---|---|---|---|
| 5,479,211 A * | 12/1995 | Fukuda | 375/240.03 |
| 5,808,697 A | 9/1998 | Fujimura et al. | |
| 6,490,319 B1 | 12/2002 | Yang | |
| 7,003,153 B1 | 2/2006 | Kerofsky | |
| 7,006,568 B1 | 2/2006 | Gu et al. | |
| 2004/0114817 A1 | 6/2004 | Jayant et al. | |
| 2004/0156559 A1 | 8/2004 | Cheng et al. | |
| 2005/0031201 A1 * | 2/2005 | Goh | G06T 5/009 382/169 |
| 2005/0035974 A1 * | 2/2005 | Nair et al. | 345/589 |
| 2006/0008003 A1 | 1/2006 | Ji et al. | |
| 2006/0153287 A1 * | 7/2006 | Shen | 375/240 |
| 2006/0164523 A1 * | 7/2006 | Jiang | G06T 5/009 348/234 |
| 2006/0239581 A1 | 10/2006 | Neuman | |
| 2007/0053587 A1 | 3/2007 | Ali | |
| 2008/0018506 A1 * | 1/2008 | Raveendran | 341/51 |

OTHER PUBLICATIONS

Ji, et al., "Adaptive Image Contrast Enhancement Based on Human Visual Properties", IEEE Transactions on Medical Imaging, vol. 13, No. 4, Dec. 1994, IEEE.
Yu, "Improvement of Video Coding Efficiency for Multimedia Processing", Dec. 2001.
Tang, et al., "Image Enhancement Using a Contrast Measure in the Compressed Domain", IEEE Signal Processing Letters, vol. 10, No. 10, Oct. 2003, IEEE.
Mantiuk, et al., "Backward Compatible High Dynamic Range MPEG Video Compression", Proceedings of ACM SIGGRAPH'06, ACM, 2006.

* cited by examiner

*Primary Examiner* — Faruk Hamza
*Assistant Examiner* — Thinh Tran
(74) *Attorney, Agent, or Firm* — Sonia Cooper; Fehmi Chebil; Micky Minhas (57) ABSTRACT

Architecture for enhancing the compression (e.g., luma, chroma) of a video signal and improving the perceptual quality of the video compression schemes. The architecture operates to reshape the normal multimodal energy distribution of the input video signal to a new energy distribution. In the context of luma, the algorithm maps the black and white (or contrast) information of a picture to a new energy distribution. For example, the contrast can be enhanced in the middle range of the luma spectrum, thereby improving the contrast between a light foreground object and a dark background. At the same time, the algorithm reduces the bit-rate requirements at a particular quantization step size. The algorithm can be utilized also in post-processing to improve the quality of decoded video.

19 Claims, 11 Drawing Sheets

ENTROPY CODING EFFICIENCY ENHANCEMENT UTILIZING ENERGY DISTRIBUTION REMAPPING

BACKGROUND

The Internet and other communications networks have evolved to facilitate not only the distribution of video media as files but also streaming video for use in business and consumer applications. For example, employees are now able to participate in business meetings while on travel via video conferencing. Additionally, the consumer can interact with family and friends via video communications using home computers and other capable devices.

However, realtime video communication can impose huge demands on the computing system and the network, thereby requiring video compression schemes that operate at very low bit rates while still achieving good perceptual quality. The need for good perceptual quality can be especially important for image processing in medical applications. For example, contrast enhancement in radiography and mammography is of particular importance in the medical field. Given that image processing is closely related to video processing, it is desirable to obtain compression techniques that provide at least quality image and video output and low impact on the associated communication aspects.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes an algorithm (or mapping function) that enhances the compression (e.g., luma, chroma) of a video signal, and thus, improves the perceptual quality of the video compression schemes. The architecture operates to reshape the normal multimodal energy distribution of the input video signal to a new energy distribution.

In the context of luma, the algorithm maps the black and white (or contrast) information of a picture to a new energy distribution (e.g., multimodal). In one implementation, the contrast is enhanced in the middle range of the luma spectrum, thereby improving the contrast between a light foreground object and a dark background. At the same time, the algorithm reduces the bit-rate requirements at a particular quantization step size. The algorithm can be utilized also in post-processing to improve the quality of decoded video.

The architecture does not require any change to the bit stream syntax or decoder, and hence, is backward compatible with existing video compression standards such as VC-1, H.263 and H.264, thereby improving the quality of video compression standards. The architecture can be used to improve the quality of all video compression algorithms used for realtime video communication (e.g., broadcasting) and/or non-realtime video applications (e.g., media archiving)

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

The disclosed architecture is novel energy redistribution technique that can be applied to luma and chroma space to redistribute multimodal energy in video signals in realtime pre- and/or post-processing functions. The remapping or redistribution function improves the perceived image quality by enhancing the contrast, for example, in the middle range of the luma spectrum. The technique improves the contrast between a light foreground object and a dark background, for example. The technique also removes multimodal regions of the luma signal within the bright or dark regions of the spectrum, and can be used to improve the quality of all video compression algorithms used for realtime video communication (e.g., broadcasting) and/or non-realtime video applications (e.g., media archiving)

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
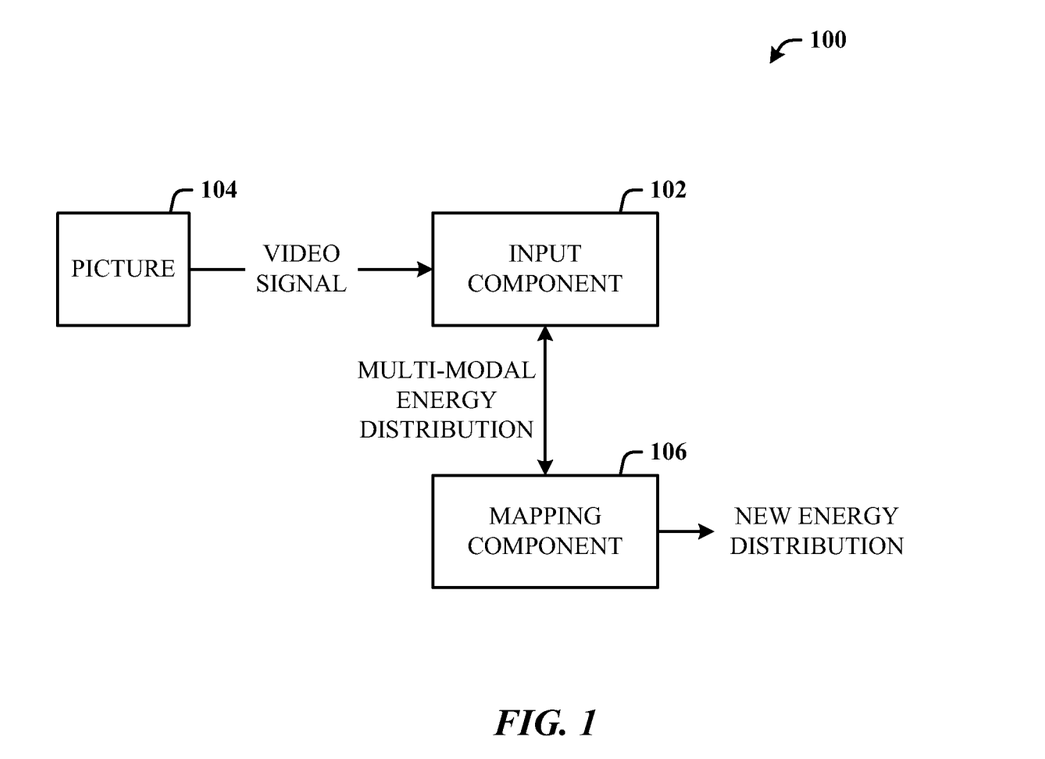
FIG. 1 illustrates a computer-implemented picture processing system.

FIG. 1 illustrates a computer-implemented picture processing system 100. The system 100 includes an input component 102 for receiving a video signal associated with a picture 104, the picture 104 including a multimodal energy distribution. The system 100 can also include a mapping component 106 (e.g., function or look-up table (LUT)) for mapping the multimodal energy distribution of the picture to a new energy distribution to improve quality in the picture.

The term picture, as used throughout this description is intended to include a frame or a field. A frame is an image captured at some point in time. A field includes the set of lines (or every other line) that form an image at some point in time. Interlaced video is more often associated with the coding of pictures as fields.

This technique does not require any change to the bit stream syntax or decoder, and is compatible with video compression standards such as VC-1, H.263 and H.264 (also referred to as MPEG-4, and which uses slices rather than picture designations), for example. Hence, the technique can be used to improve the quality of video compression standards.

Figure 2:
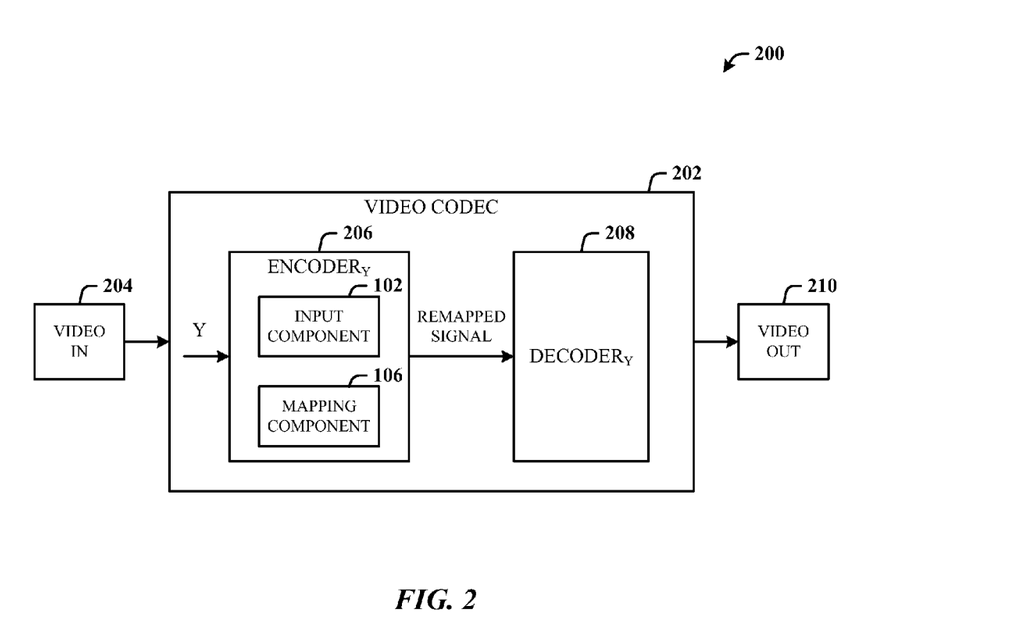
FIG. 2 illustrates a system that employs energy distribution remapping for the contrast (or luma (Y)) vector in video signal processing.

FIG. 2 illustrates a system 200 that employs energy distribution remapping for the contrast (or luma (Y)) vector in video signal processing. The system 200 includes a video codec 202 (e.g., lossless or lossy) that receives a video-in signal 204 (e.g., analog or digital) for encoding by a luma encoder 206 and decoding by a luma decoder 208 to create a video-out signal 210. Here, input processing in the encoder 206 includes utilization of the input component 102 and the mapping component 106 for remapping the multimodal energy distribution for contrast to a new energy distribution (e.g., single mode). The remapped signal is then passed to the decoder 208 for decoding as the video-out signal 210.

Note that although shown only as part of the encoder 206, post-processing in the decoder 208 can employ the input component 102 and mapping component 106 in combination with these components (102 and 106) in the encoder 206, or alternatively, to use in the encoder 206. In this case, only the perceptual quality is improved, and there is no change in bit rate.

Figure 3:
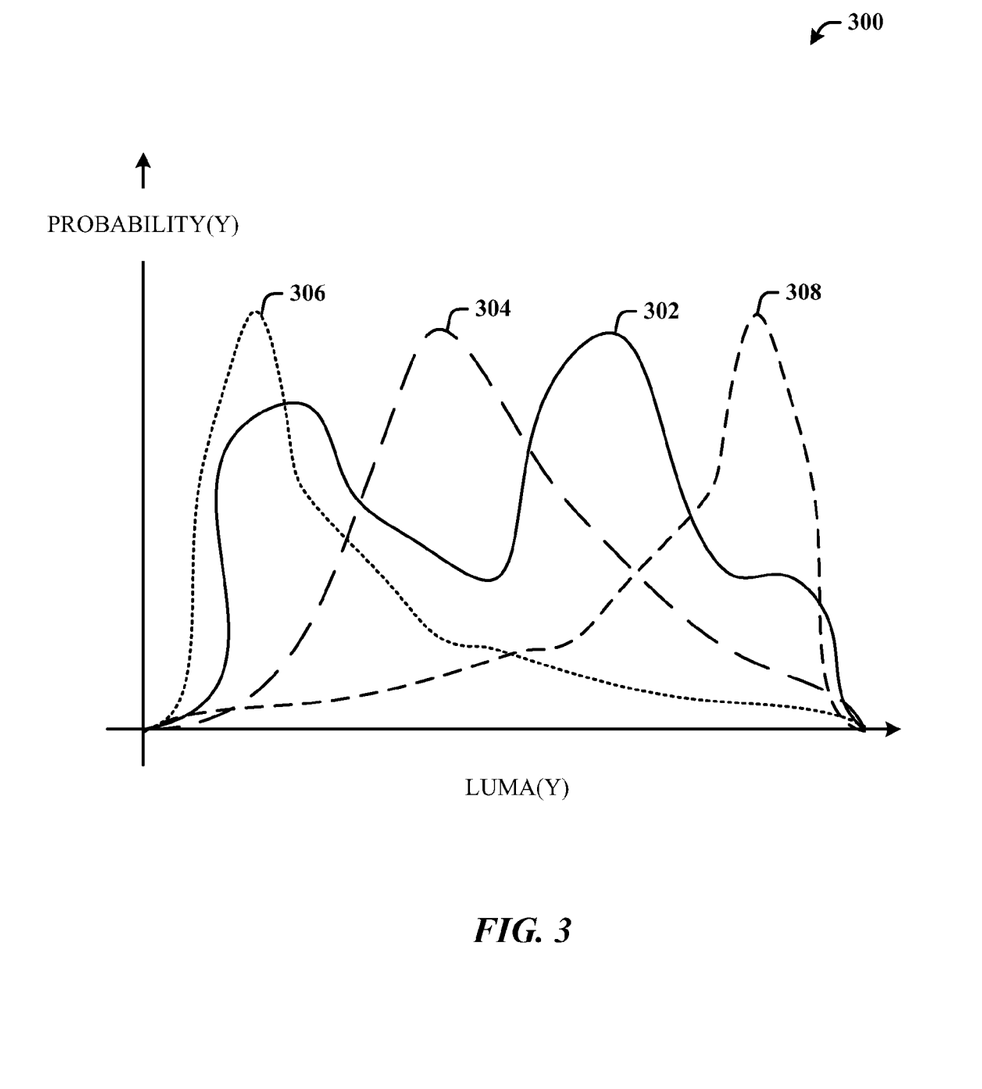
FIG. 3 illustrates a luma distribution graph showing remapping of a multimodal energy distribution to a new energy distribution.

FIG. 3 illustrates a luma distribution graph 300 showing remapping of a multimodal energy distribution 302 to a new energy distribution 304. In other words, the remapping by the mapping component reduces the number of peaks (or more concentrated) in the multimodal representation relative to the new distribution 304. Here, the redistribution is approximate to the middle range of the multimodal energy distribution 302. However, this is not to be construed as a limitation, in that the redistribution can be in any general area along the spectrum, from the lower end to the upper end. For example, redistribution can result in a new more concentrated lower range energy distribution 306 or a new more concentrated upper range energy distribution 308. No stretching or offsetting is required. Moreover, this technique is not restricted to contrast, but can also be employed for chroma signals.

Figure 4:
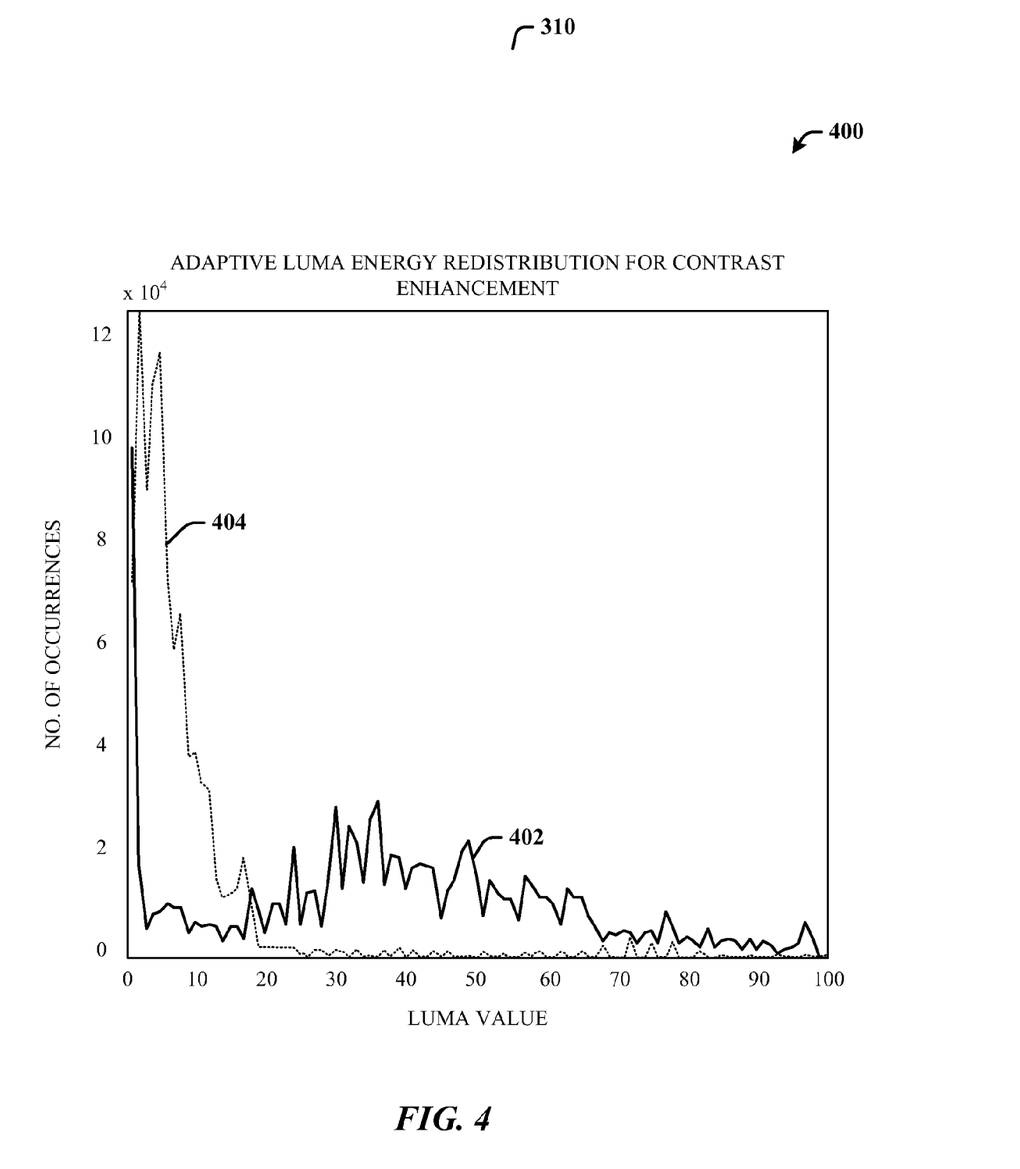
FIG. 4 illustrates a graph that the remapping of luma distribution of FIG. 3 reduces the bit rate for encoding purposes thereby retaining quality in the output signal during the encoding process.

FIG. 4 illustrates a graph 400 that the remapping of luma distribution of FIG. 3 reduces the bit rate for encoding purposes thereby retaining quality in the output signal during the encoding process. The motivation is to reduce the overall signal amplitude along the vertical axis (the number of appearances). The input signal 402 is reduced to the redistributed signal 404 making the probability (Y) more concentrated rather than multimodal. The area under the input signal 402 is exactly the area under the redistributed signal 404.

Figure 5:
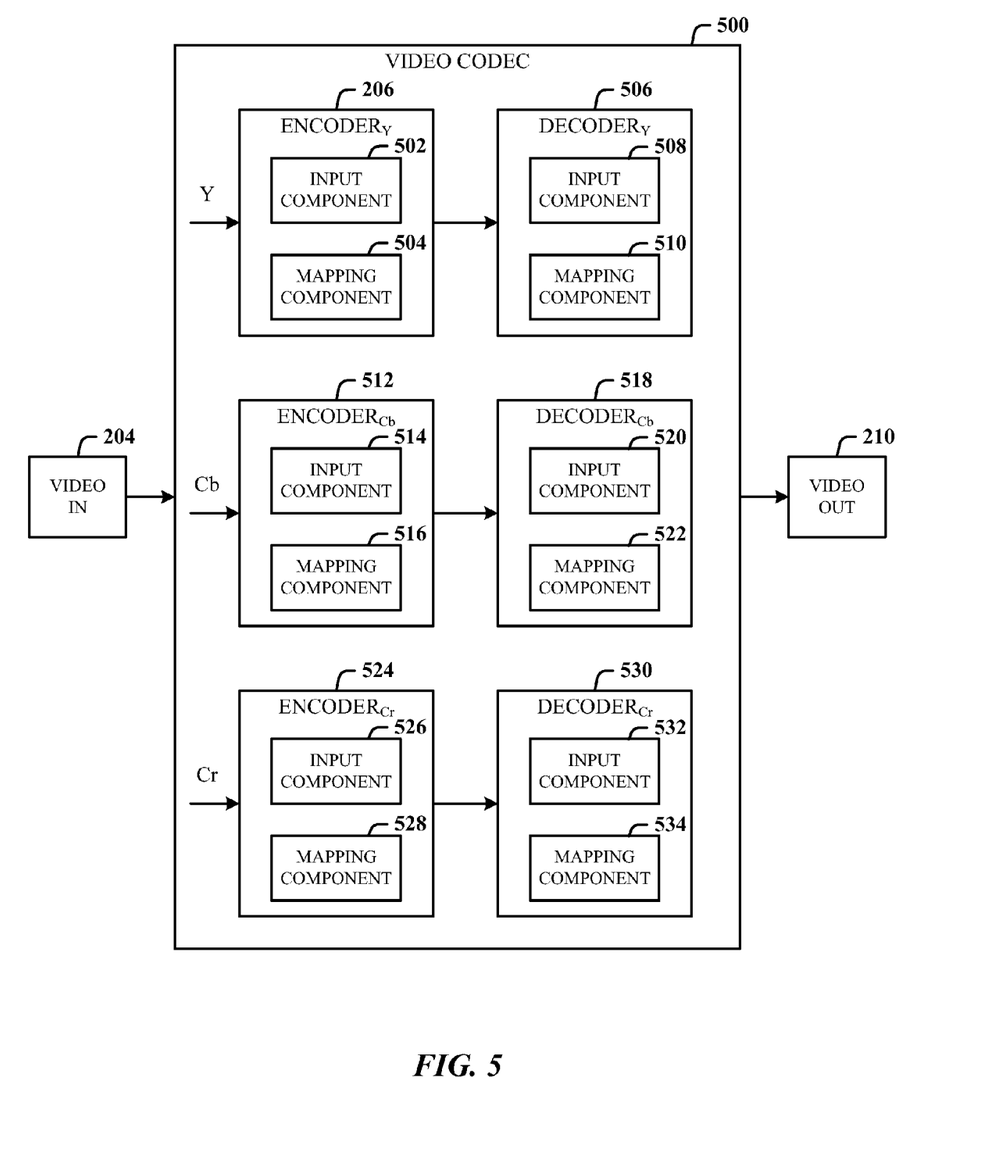
FIG. 5 illustrates the remapping of energy distributions for luma (Y) and chroma (CbCr) in a video codec.

FIG. 5 illustrates the remapping of energy distributions for luma (Y) and chroma (CbCr) in a video codec 500. The color portion of video can also obtain the benefits associated with the remapping of energy distributions. The codec 500 illustrates the utilization of remapping for luma and chroma; however, it is to be understood that the codec 500 can include remapping only for the color signals, only the luma signals (as in FIG. 2), or the combination of both luma and color.

Here, the codec 500 is illustrated with three separate codec sections for video signal processing: a luma section 502, a chroma Cb section 504, and a chroma Cr section 506. However, it is to be appreciated that a single codec can be utilized for all three sections (502, 504 and 506). Moreover, as previously indicated, it is not a requirement that remapping be employed in post-processing as well as pre-processing. Thus, the decoders do not need to include remapping functionality. Additionally, not shown is a video interface for splitting out the luma and chroma signals from the video-in signal 204 to the separate encoder or a video interface for combining the remapping signals into the video-out signal 210.

The luma encoder 206 is shown as including a pre-processing input component 502 and mapping component 504, and the luma decoder 506 includes a post-processing input component 508 and mapping component 510. Similarly, a chroma Cb encoder 512 is shown as including a pre-processing input component 514 and a mapping component 516, and the chroma Cb decoder 518 includes a post-processing input component 520 and a mapping component 522. A chroma Cr encoder 524 is shown as including a pre-processing input component 526 and a mapping component 528, and the chroma Cr decoder 530 includes a post-processing input component 532 and a mapping component 534.

Variations on this system 500 can include a single encoder that receives or generates the split-out luma and chroma signals using a single mapping component or LUT for operating on the signals, separate encoders for the three inputs and a single decoder, a single luma encoder and a single chroma encoder (for both Cb and Cr) both using separate decoders or the same decoder, and so on.

Figure 6:
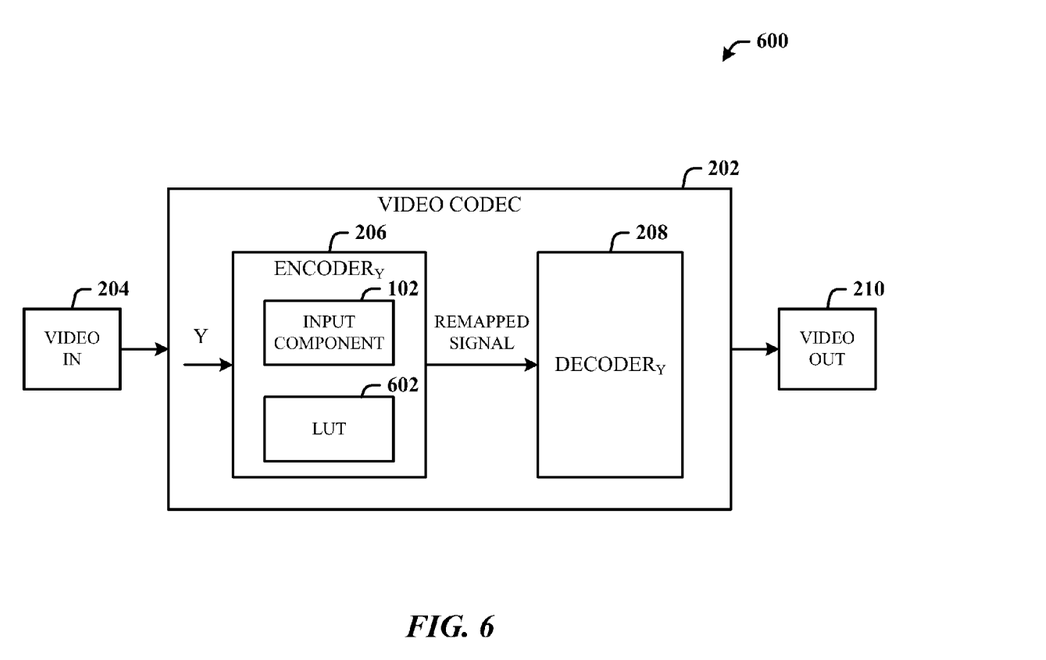
FIG. 6 illustrates the use of a look-up table for the remapping of multimodal energy distributions to more concentrated energy distributions.

FIG. 6 illustrates the use of a LUT 602 for the remapping of multimodal energy distributions to more concentrated energy distributions. The video codec 202 comprises the encoder 206, shown as including the input component 102 for receiving the video-in signal 204 (via a video interface (not shown)) and the LUT 602, and the decoder 208 is unchanged. The remapped signal using the LUT 602 is passed to the decoder 208 for generation of the video-out signal 210 (e.g., via a video interface (not shown)). The LUT 602 can be programmable (e.g., during blanking intervals). The LUT 602 can be updated in realtime by a graphics processor where the LUT 602 can be stored in graphics adapter memory (e.g., dual-port RAM, flash, etc.). In another embodiment, the LUT 602 can be used for the encoder 208 while the remapping component (not shown) can be used in the decoder 208, for example, or vice versa.

Figure 7:
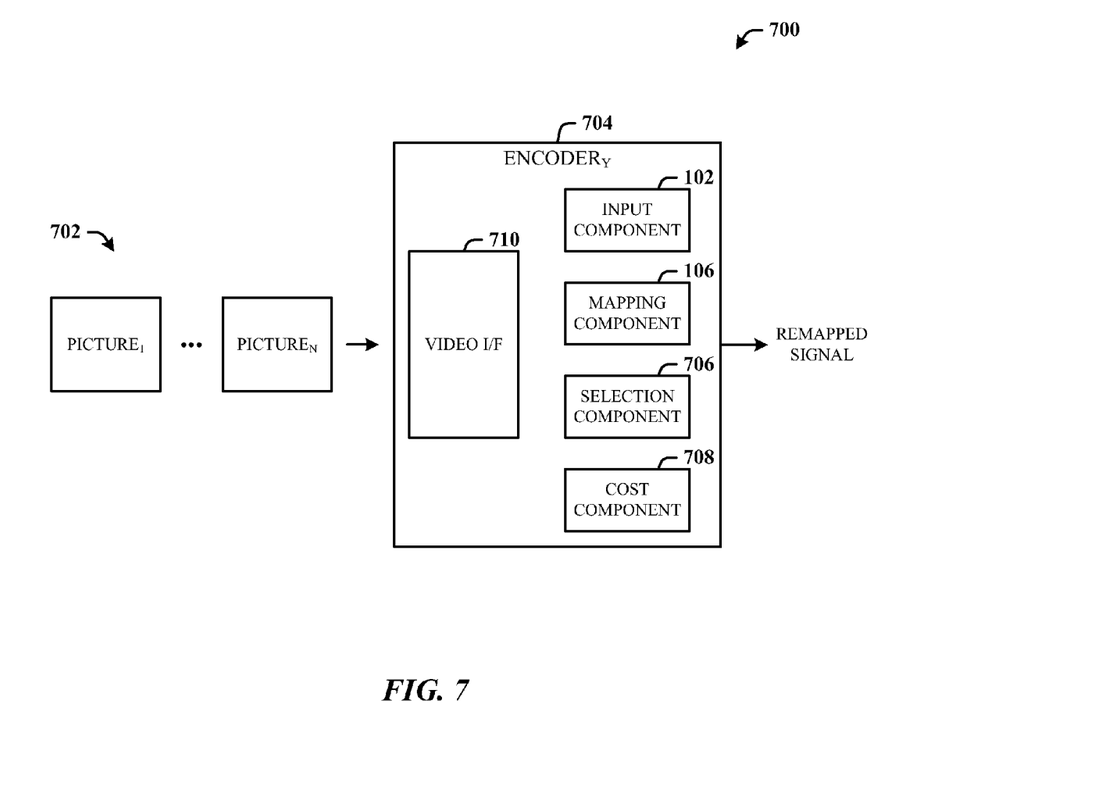
FIG. 7 illustrates a system for the selective processing of pictures of an input video stream for contrast enhancement.

FIG. 7 illustrates a system 700 for the selective processing of pictures of an input video stream for contrast enhancement. The remapping process can be performed for every picture of a set of input pictures 702 of a video stream which is more compute intensive than selecting less than all pictures for processing. For example, it may be more desirable to select every other picture, or every third picture. In order to make more intelligent decisions, the system 700 includes an encoder 704 that includes not only the input component 102 and mapping component 106, but also a selection component 706 for selecting the pictures to process and a cost component 708 for computing a cost associated with selection of the number of input pictures. For example, the cost may be high to process all of the input pictures 704, whereas the cost can be less when selecting a subset of the input pictures 704. The cost component 708 can include, for example, a statistical or probabilistic algorithm for computing cost of tradeoffs in processing all pictures or a subset of the pictures. The pictures 704 are received by a video interface 710 that splits out the signal components into luma and chroma signals, for example.

The cost can be based on a number of factors such as quality of the output (as a feedback parameter), complexity (e.g., color content) of the pictures (black and white versus color), processing capabilities of the hardware/software system employed, dynamic change (e.g., contrast) from picture to picture, and so on. The selection can be preconfigured such as every other picture, every third picture, etc., and/or set for dynamic operation where the encoder dynamically selects from all pictures to a subset of the pictures for energy distribution remapping in realtime. The cost component 708 provides a mechanism for computing a tradeoff between performance and complexity.

The remapping function can be computed for the I-pictures (intra-pictures), and the same remapping function is then applied for all subsequent P-pictures (predicted) and B-pictures (bi-predicted) in a group of pictures (GOP). The use of same preprocessing mapping component 106 (e.g., a function or a LUT) for the GOP eliminates temporal flickering within the GOP, and also minimizes the bit rate of P- and B-pictures. The computational complexity required to compute the remapping function is also reduced, since the function is computed only once for every GOP. To reduce complexity, the actual remapping can be implemented as the LUT. This applies to slices or I-frames or key frames as well.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
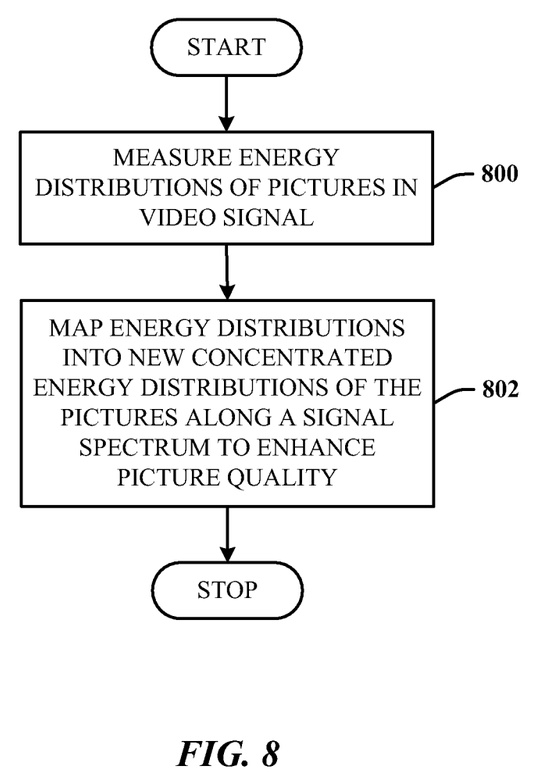
FIG. 8 illustrates a method of processing pictures.

FIG. 8 illustrates a method of processing pictures. At 800, energy distributions of pictures in a video signal are measured. At 802, the energy distributions of the pictures are mapped into new concentrated energy distributions along a signal spectrum to enhance quality in the pictures. The mapping process removes multimodal regions in the energy distributions when mapping the energy distributions to the new concentrated energy distributions. The mapping of a new concentrated energy distribution can be in a mid-range of a luma signal spectrum to control contrast of a picture. The mapping of a new concentrated energy distribution can be in a chroma spectrum of a picture. The method can further comprise generating a baseline value for a darkest portion of a picture and a baseline value for a brightest portion of the picture. The method can further comprise computing a mapping function for an I-Frame and applying the mapping function for P-Frames and B-Frames in a group of the pictures.

Figure 9:
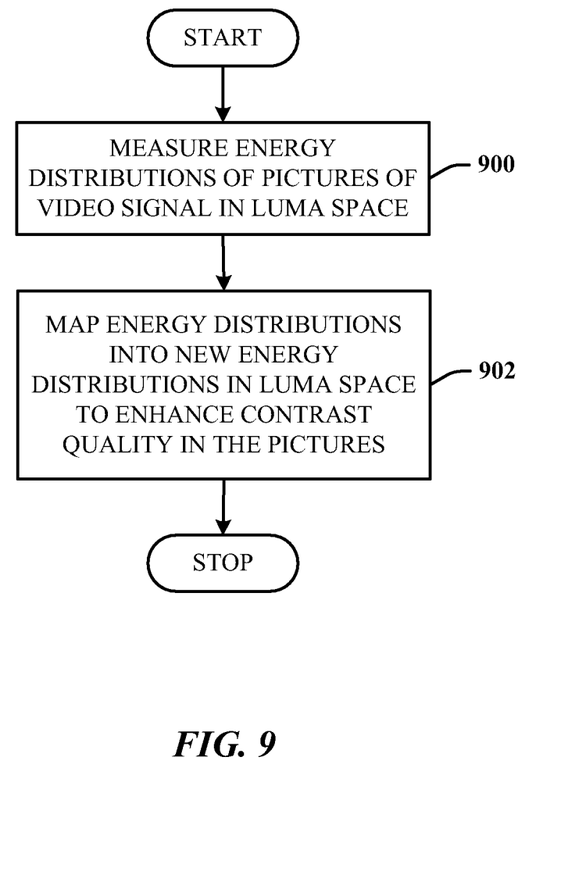
FIG. 9 illustrates a method of processing contrast in pictures.

FIG. 9 illustrates a method of processing contrast in pictures. At 900, energy distributions of the pictures of a video signal are measured in luma space. At 902, the energy distributions are then mapped into new energy distributions in luma space to enhance contrast quality in the pictures. The method can also include removing multimodal effects in the energy distributions when mapping to the new energy distributions. The new energy distributions (having the multimodal effects removed) are mapped to the mid-range of the luma space. As part of measuring the energy distributions, the baseline value for a darkest portion of a picture in the luma space is computed as well as and a baseline value for a brightest portion of the picture in the luma space. The mapping process can be based on a mapping function computed for mapping the energy distributions into the new energy distributions. The mapping function can be computed for an I-Frame and applied to P-Frames and B-Frames in a group of the pictures. Alternatively, or in combination therewith, the mapping process can employ a look-up table via which the mapping of the energy distributions is performed.

Figure 10:
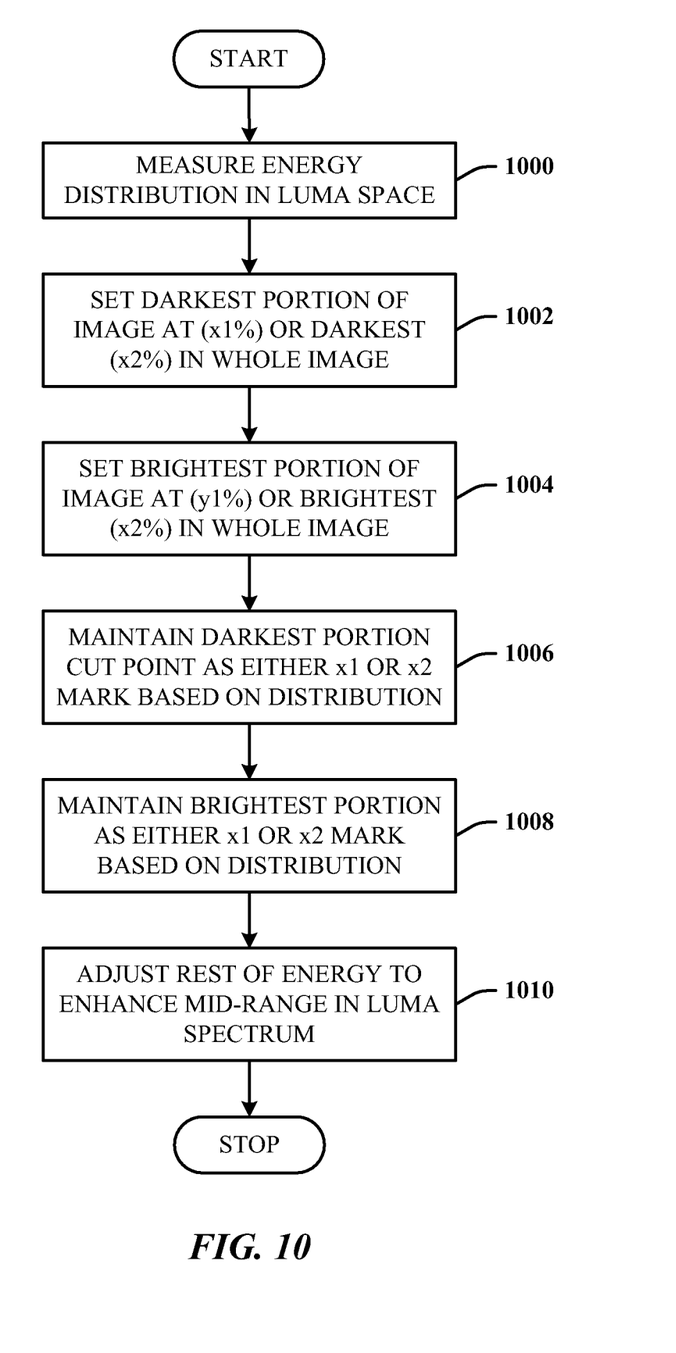
FIG. 10 illustrates a method of computing a mapping function.

FIG. 10 illustrates a method of computing a mapping function. At 1000, the energy distribution is measured in luma space. At 1002, the darkest portion of the image is computed as (x1%) or the darkest (x2%) in the whole image. At 1004, the brightest portion of the image is computed as (y1%) or the brightest (y2%) in the whole image. At 1006, the energy is redistributed by maintaining the darkest portion cut point (or baseline) as either x1 or x2 mark, depending on the distribution. At 1008, the energy is redistributed by also maintaining the brightest portion (or baseline) as either y1 or y2 mark, depending on the distribution. At 1010, the rest of the energy is then adjusted to enhance the mid-range in the luma spectrum.

The mapping function compacts the energy distribution in the less important dark and light regions on the video. The compaction reduces the bit-rate that is required to code these regions. The contrast enhancement in the mid-range of the luma spectrum improves the perceptual quality as it increases the contrast between foreground and background areas.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
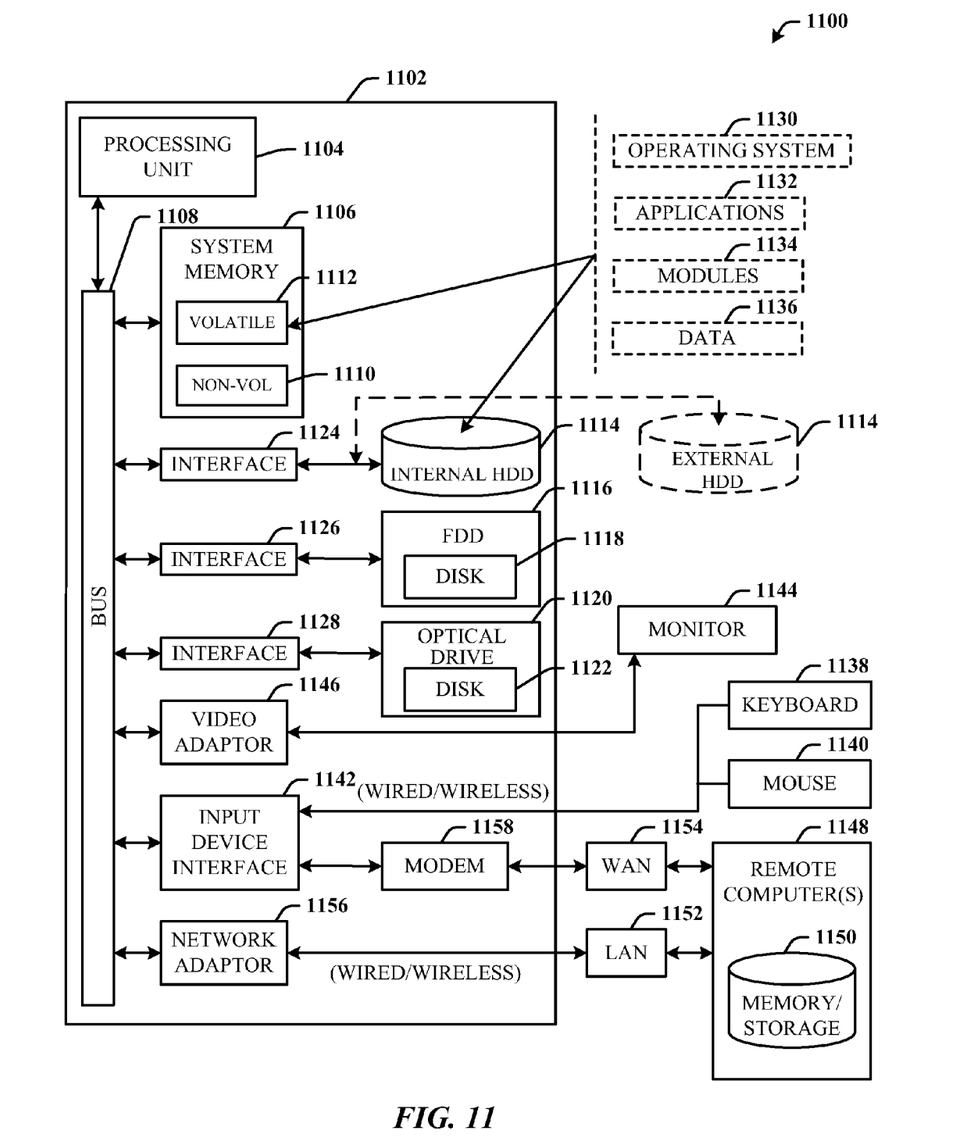
FIG. 11 illustrates a block diagram of a computing system operable to execute energy distribution remapping in accordance with the disclosed architecture.

Referring now to FIG. 11, there is illustrated a block diagram of a computing system 1100 operable to execute energy distribution remapping in accordance with the disclosed architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102 having a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 can include non-volatile memory (NON-VOL) 1110 and/or volatile memory 1112 (e.g., random access memory (RAM)). A basic input/output system (BIOS) can be stored in the non-volatile memory 1110 (e.g., ROM, EPROM, EEPROM, etc.), which BIOS are the basic routines that help to transfer information between elements within the computer 1102, such as during start-up. The volatile memory 1112 can also include a high-speed RAM such as static RAM for caching data.

The computer 1102 further includes an internal hard disk drive (HDD) 1114 (e.g., EIDE, SATA), which internal HDD 1114 may also be configured for external use in a suitable chassis, a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as a DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1112, including an operating system 1130, one or more application programs 1132, other program modules 1134, and program data 1136. All or portions of the operating system, applications, modules, and/or data can also be cached in the volatile memory 1112. It is to be appreciated that the disclosed architecture can be implemented with various commercially available operating systems or combinations of operating systems.

A user can enter commands and information into the computer 1102 through one or more wire/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, etc.

A monitor 1144 or other type of display device is also connected to the system bus 1108 via an interface, such as a video adaptor 1146. The video adaptor 1146 can include the hardware and/or software in the form of input component 102, mapping component 106, the video codec 202 and associated components (e.g., mapping function or LUT 602), the video codec 500 and associated components, and encoder 704 and associated selection component 706 and cost component 708, for example.

In addition to the monitor 1144, a computer typically includes other peripheral output devices (not shown), such as speakers, printers, etc.

The computer 1102 may operate in a networked environment using logical connections via wire and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, is connected to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented picture processing system, comprising:
    a memory and a hardware processor respectively configured to store and execute instructions that implement computer-executable components, the computer-executable components comprising:
    an input component configured to receive a video signal associated with a picture, the picture including a multimodal energy distribution represented by a plurality of peaks along a luma signal spectrum;
    a mapping component configured to map the multimodal energy distribution of the picture to a new energy distribution, the new energy distribution compacted in dark and light regions to reduce bit-rate requirements of the dark and light regions and to enhance contrast in a mid-range region of the luma signal spectrum of the new energy distribution;
    a cost component configured to compute a cost associated with selection of the picture from a plurality of pictures and computing the new energy distribution of the picture relative to new energy distributions for the plurality of pictures; and
    a decoder configured to decode the video signal using the new energy distribution of the picture.

2. The system of claim 1, wherein the multimodal energy distribution is a luma energy distribution that is remapped to a more concentrated new luma energy distribution.

3. The system of claim 1, wherein the mapping component is configured to enhance contrast between darkest and brightest information of the picture by removing multi-regions of concentration of luma signal between the dark and bright regions of the spectrum.

4. The system of claim 1, wherein the multimodal energy distribution further comprises a chroma energy distribution that is remapped to a more concentrated new chroma energy distribution.

5. The system of claim 1, wherein the mapping component is a function or a look-up table employed to remove multi-regions of concentration of a luma signal within bright or dark regions of a spectrum.

6. The system of claim 1, wherein the mapping component is configured to redistribute the energy of the multimodal energy distribution into the new energy distribution as part of codec pre-processing.

7. The system of claim 1, wherein the mapping component is configured to redistribute the energy of the multimodal energy distribution into the new energy distribution as part of codec post-processing.

8. A computer-implemented method of processing pictures, performed by a computer system executing machine-readable instructions, the method comprising acts of:
    measuring luma energy distributions of pictures in a video signal represented by a plurality of signal peaks;
    mapping the energy distributions of the pictures into a new luma energy distribution in a selected concentrated range along a luma signal spectrum, the new luma energy distribution compacted in dark and light regions to reduce bit-rate requirements of the dark and light regions and to enhance contrast in a mid-range region of the luma signal spectrum of the new luma energy distribution;
    computing a cost associated with selection of the picture from a plurality of pictures and computing the new energy distribution of the picture relative to new energy distributions for the plurality of pictures; and
    decoding, by a decoder, the video signal using the new energy distribution of the picture.

9. The method of claim 8, further comprising mapping a new concentrated energy distribution in a mid-range of a luma signal spectrum to control contrast of a picture.

10. The method of claim 8, further comprising mapping a new concentrated energy distribution in a chroma spectrum of a picture.

11. The method of claim 8, further comprising generating a baseline value for a darkest portion of a picture and a baseline value for a brightest portion of the picture.

12. The method of claim 8, further comprising computing a mapping function for an I-Frame and applying the mapping function for P-Frames and B-Frames in a group of the pictures.

13. The method of claim 8, further comprising removing multimodal regions in the energy distributions when mapping to the new concentrated energy distributions.

14. A computer-implemented method of processing pictures, performed by a computer system executing machine-readable instructions, the method comprising acts of:
    measuring energy distributions of pictures of a video signal represented by a plurality of signal amplitude peaks in luma space;
    mapping the energy distributions into new concentrated energy distributions in luma space, the new concentrated energy distributions compacted in dark and light regions to reduce bit-rate requirements of the dark and light regions and to enhance contrast quality in the pictures in a mid-range region of the luma space of the new concentrated energy distribution;

computing a cost associated with selection of the picture from a plurality of pictures and computing the new energy distribution of the picture relative to new energy distributions for the plurality of pictures; and decoding, by a decoder, the video signal using the new energy distribution of the picture.

15. The method of claim 14, further comprising removing multimodal effects in the energy distributions when mapping to the new energy distributions.

16. The method of claim 15, further comprising mapping the new energy distributions to a mid-range of the luma space.

17. The method of claim 14, further comprising computing a baseline value for a darkest portion of a picture in the luma space and a baseline value for a brightest portion of the picture in luma space.

18. The method of claim 14, further comprising computing a mapping function for mapping the energy distributions into the new energy distributions, the mapping function computed for an I-Frame and applying the mapping function for P-Frames and B-Frames in a group of the pictures.

19. The method of claim 14, further comprising generating a look-up table via which the mapping of the energy distributions is performed.

* * * * *